(12) United States Patent
Kong

(10) Patent No.: US 6,216,092 B1
(45) Date of Patent: Apr. 10, 2001

(54) DOSAGE MONITOR FOR DEIONIZED WATER GENERATOR

(75) Inventor: Szk-On Kong, Singapore (SG)

(73) Assignee: Chartered Semiconductor Manufacturing, Ltd., Singapore (SG)

(*) Notice: Subject to any disclaimer, the term of this patent is extended or adjusted under 35 U.S.C. 154(b) by 0 days.

(21) Appl. No.: 09/072,003

(22) Filed: May 4, 1998

(51) Int. Cl.$^7$ .............................. G06F 19/00; C02F 1/42
(52) U.S. Cl. .............................. 702/50; 702/55; 700/282; 210/660; 210/662
(58) Field of Search ................... 702/50, 45–46, 702/55; 210/660, 662, 678, 687; 700/281–282

(56) References Cited

U.S. PATENT DOCUMENTS

| | | | |
|---|---|---|---|
| 3,676,336 | * | 7/1972 | O'Brien et al. ................... 210/662 |
| 3,969,242 | * | 7/1976 | Kruse ................... 210/662 |
| 4,145,279 | * | 3/1979 | Selby, III ................... 210/662 |
| 4,275,448 | * | 6/1981 | Le Dall ................... 210/662 |
| 4,490,249 | | 12/1984 | Seal ................... 210/89 |

* cited by examiner

Primary Examiner—Marc S. Hoff
Assistant Examiner—Bryan Bui
(74) Attorney, Agent, or Firm—George O. Saile; Rosemary L.S. Pike

(57) ABSTRACT

An apparatus and method are described for determining precisely when the resin column in a deionized water generator needs to be regenerated. This is achieved by causing the untreated water to pass through a flowmeter and by measuring its electrical conductivity and temperature. After subtracting the value for pure water from the conductivity value and correcting for temperature, the two numbers are converted to an impurity concentration which is multiplied by the flow rate to give a value for weight of impurity per unit time. The latter value is integrated over time by accumulating sample values read at regular intervals, thereby generating a dosage value. This dosage may be displayed for viewing and/or compared with the known capacity of the system's resin column so that an alarm may be sounded when regeneration is needed.

16 Claims, 4 Drawing Sheets

FIG. 1 – Prior Art

DOSAGE MONITOR FOR DEIONIZED WATER GENERATOR

FIELD OF THE INVENTION

The invention relates to the general field of ion exchange resins, more particularly deionized water generators and methods for the precise determination of when recharging of the resin is due.

BACKGROUND OF THE INVENTION

Ion exchange resins have been in use for many years for the purpose of softening hard water. Their utility derives from their tendency to adsorb certain ions in preference to others. In particular, in softening systems they will remove undesirable cations such as calcium or magnesium from hard water, substituting in their place more benign cations such as sodium.

Once all adsorption sites on the resin have been filled with hard water ions the system needs to be regenerated. This is done by exposing the resin to a highly concentrated solution of sodium. Following the law of mass action, the adsorption reaction is now driven in the reverse direction. The sites are once more filled with sodium ions and the 'bad' cations are driven out into solution once more where they can be readily disposed of.

With the advent of the semiconductor industry, a need for large amounts of deionized (DI) water arose. In this instance, the most common cation in need of removal was sodium while the most common anion was chlorine. Accordingly, DI water generation units of the kind illustrated in FIG. 1 were developed. Column shaped container 10 is packed with cation exchange resin (CER) 12 and anion exchange resin (AER) 14. Water in need of de-ionization 11 enters through inlet tube 17 and is directed to the top of the column. It then trickles down through CER 12 and AER 14 before emerging as DI water 13.

In the CER the sodium ions are exchanged for hydrogen ions while in the AER the chloride ions are exchanged for hydroxyl ions. As they are released, the hydrogen and hydroxyl ions recombine to form water molecules so the net number of ions in the water is reduced.

In production line situations, where any given water de-ionizing unit is operating continuously, it becomes necessary to regenerate the CER and AER on a daily, weekly, or monthly basis, depending on the tank size and the flow rate. As in the water softener case, regeneration is forced by immersing the resins in high concentration solutions of the 'good' ions. In this instance, hydrochloric acid for the CER and sodium hydroxide for the AER.

Because costs need to be controlled very closely, it is important that regeneration take place exactly when it is needed. If regeneration takes place too soon, the deionizing unit is out of action sooner than necessary and more regenerating chemicals will be consumed than necessary. If it takes place too late, the unit stops producing deionized water, with disastrous consequences for the production line.

Since the rate at which DI water emerges from the unit is governed by the demands of the line and is therefore constantly changing, simply measuring the time since the previous regeneration is an inadequate solution to this problem. Nor is monitoring the ion concentration of the outputted water an adequate solution since, by the time an increase in ion concentration has been detected, it is too late. Instead, it is necessary to keep track of the total amount of impurity ions that the resins have adsorbed so that when the accumulated dosage equals the known capacity of the system, recharging of the resins can take place on a 'just in time' basis.

A dosimeter based on the above approach has been described by O'Brien et al. (U.S. Pat. No. 3,676,336 Jul 1972). The quantity of liquid that is outputted is monitored by means of a flowmeter. The device used by O'Brien generated an electrical signal that was proportional to the square of the flow rate so a square root extractor was provided to convert to a linear signal.

The quality of the liquid inputted by O'Brien et al.'s device was continually monitored by the emission of a signal that was proportional to the electrical conductivity of the untreated DI water. The two signals were then multiplied together and, if their product exceeded some preset value, a pulse was sent to a counter. When the pulse count exceeded some preset value the unit signalled a 'time to regenerate' message.

While the O'Brien unit was an improvement over what had previously been available, it suffered from several deficiencies. In particular, conductivity of the water is only an approximate indication of ion concentration and counting only those flow×conductivity products that exceed some threshold value can also lead to significant error. These limitations of O'Brien et al. will be discussed in greater detail below.

Other prior art that we found to be of interest included Le Dall (U.S. Pat. No. 4,275,448 Jun 1981) and Seal (U.S. Pat. No. 4,490,249 Dec 1984). Le Dall's system monitors and also controls the total volume of liquid that has passed through it. The hardness of the incoming liquid is used as a guide to determining what this volume should be. The quality of the outputted (that is, softened) liquid is monitored by measuring its conductivity. Seal uses a hardness meter and a flowmeter to drive a microcomputer. The latter keeps track of the amount of unsoftened water that has flowed through the system and uses this information, along with the known hardness of the water and the capacity of the system, to determine when it is time to regenerate.

SUMMARY OF THE INVENTION

It has been an object of the present invention to provide an apparatus and method for tracking the utilization of an ion exchange resin whereby regeneration of said resin can be performed exactly when needed.

A particular object of the invention has been that said apparatus and method be suitable for the generation of deionized water.

A further object of the invention has been that the method be precise and not subject to errors introduced by the use of approximate values.

Yet another object has been that the apparatus permit the use of digital, analog, or mechanical components as appropriate.

These objects have been achieved by causing the untreated water to pass through a flowmeter and measuring its electrical conductivity and temperature. These two numbers are converted to an impurity concentration which is multiplied by the flow rate to give a value for weight of impurity per unit time. The latter value is integrated over time by accumulating sample values read at regular intervals, thereby generating a dosage value. Said dosage may be displayed for viewing and/or compared with the known capacity of the system's resin column so that an alarm may be sounded when regeneration is needed.

DESCRIPTION OF THE PREFERRED EMBODIMENTS

Before the preferred embodiments are described it is necessary to discuss the deficiencies of conductivity as a measure of impurity ion concentration. An assumption that impurity concentration is directly proportional to conductivity can lead to substantial error (sometimes as high as 25%) because, although the concentration of impurity ions will, in general, increase as the concentration of the impurity is increased, a number of factors conspire to make the relationship between the two quantities a non-linear one. These include less percentage dissociation at higher concentrations and reduced ion mobility at higher concentrations. The above factors are also affected by temperature so any system that wishes to use conductivity as a measure of impurity concentration must also take temperature into account.

For any measure of the conductivity of an electrolyte to be meaningful, allowance must be made for the fact that although the dissolved ions may carry the same amount of charge, solutions of equal concentration (in weight/unit volume) contain different numbers of molecules/unit volume. For valid comparisons to be made the equivalent conductivity must be used. This is the specific conductivity multiplied by the volume of a solution containing one gram equivalent (atom or molecule) of the substance being measured.

Figure 2:
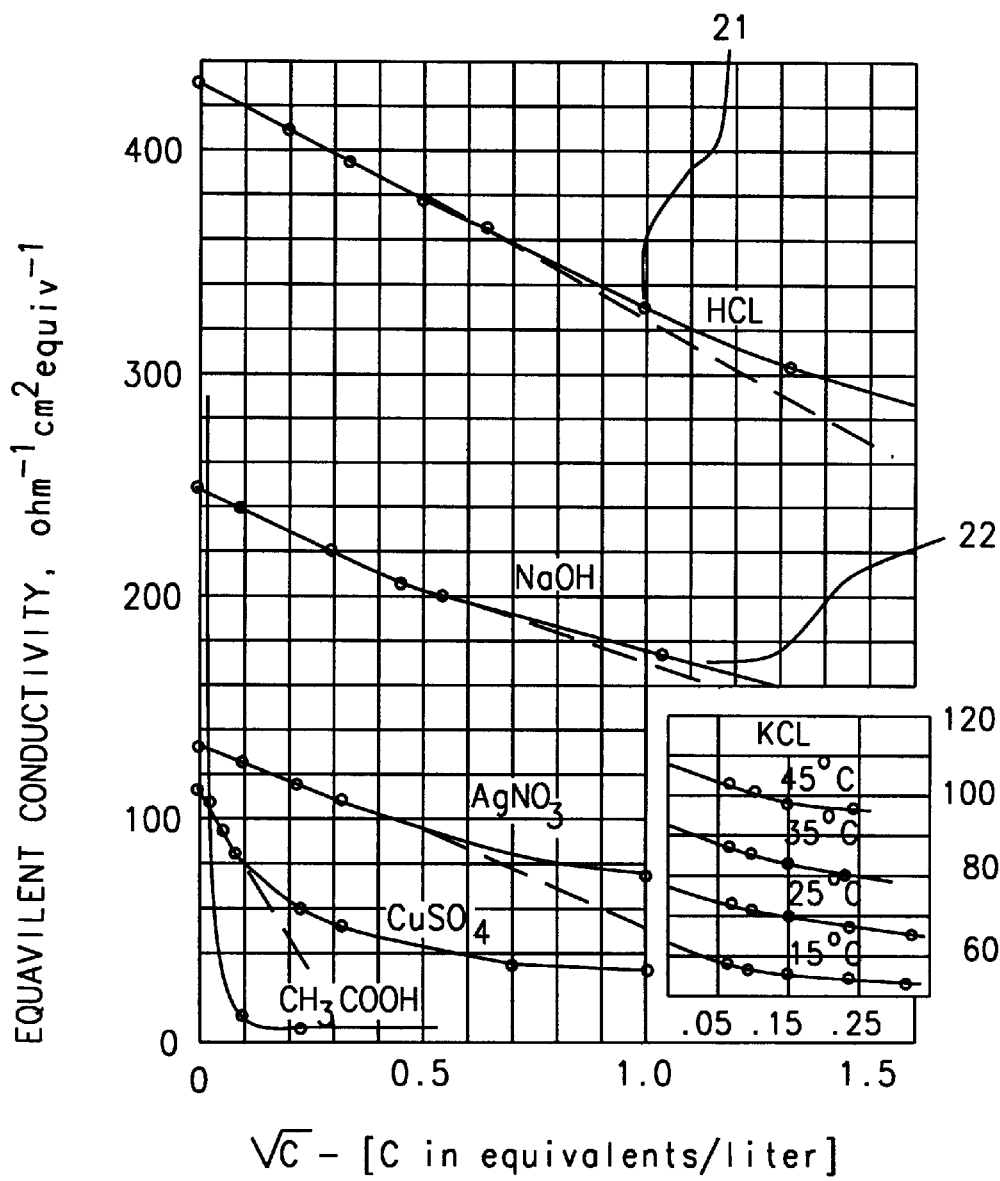
FIG. 2 is a plot of equivalent conductivity as a function of the square root of dissolved impurity concentration for several electrolytes, including an inset showing the effect of temperature.

Some examples of how equivalent conductivity varies with both concentration (in equivalents/liter) and temperature are shown in FIG. 2. Note that the equivalent conductivity has been plotted against $\sqrt{c}$, where c is the impurity concentration, so the curves appear to be much more linear than if conductivity were plotted against conductivity itself. Of special interest are curves 21 and 22 for HCl and NaOH respectively, since NaCl is the impurity that is normally the object of removal by a DI water generator. Note also that even plotting against $\sqrt{c}$ does not lead to a completely linear plot as evidenced by the linearly extrapolated (dashed) lines associated with each curve. Inset 23 illustrates how equivalent conductivity varies with temperature for a similar material (potassium chloride). As seen, for this case, the equivalent conductivity increased about 2% for every rise in temperature of 1° C.

It is thus apparent that the relationship between impurity concentration and conductivity is very complex. If the equivalent conductivity is assumed to be linear with $\sqrt{c}$, the following equation can be derived from Kohlrausch's law of ion migration:

$$(k_c)^2 - \Delta^2 c^2 + 2,000 \Delta c - 1,000,000 \kappa^2 = 0$$

where
- $k_c$ is an experimental constant
- c is the impurity concentration in equivalents per liter
- $\Delta$ is the equivalent conductivity of the impurity at infinite dilution
- $\kappa$ is the specific conductivity of the impurity solution This equation may be solved algebraicly, yielding a complex formula that may be computed by a microprocessor or, alternatively, an approximation method (such as Newton's) may be used.

As an alternative to computing a value from the above equation each time, a series of impurity concentrations may be computed once only and the results stored in a lookup table. These results should be derived from a series of conductivity values that are fairly close together so that simple linear interpolation can be applied without significant sacrifice of accuracy. An important advantage of this method is that for cases where there is insufficient data available to compute with the formula, values for the lookup table may be determined by experiment.

Another advantage of a microprocessor over methods described in the prior art is that integration over time of a number that is computed at regular known time intervals can be done precisely, regardless of how the number was arrived at or what its value was, simply by accumulating in a register. In the prior art discussed above the number would not be counted unless it exceeded some preset threshold and then only the number of times that the threshold was crossed was recorded, not the accumulated value. Clearly, such a scheme is subject to major errors unless the number being integrated stays relatively constant.

Figure 1:
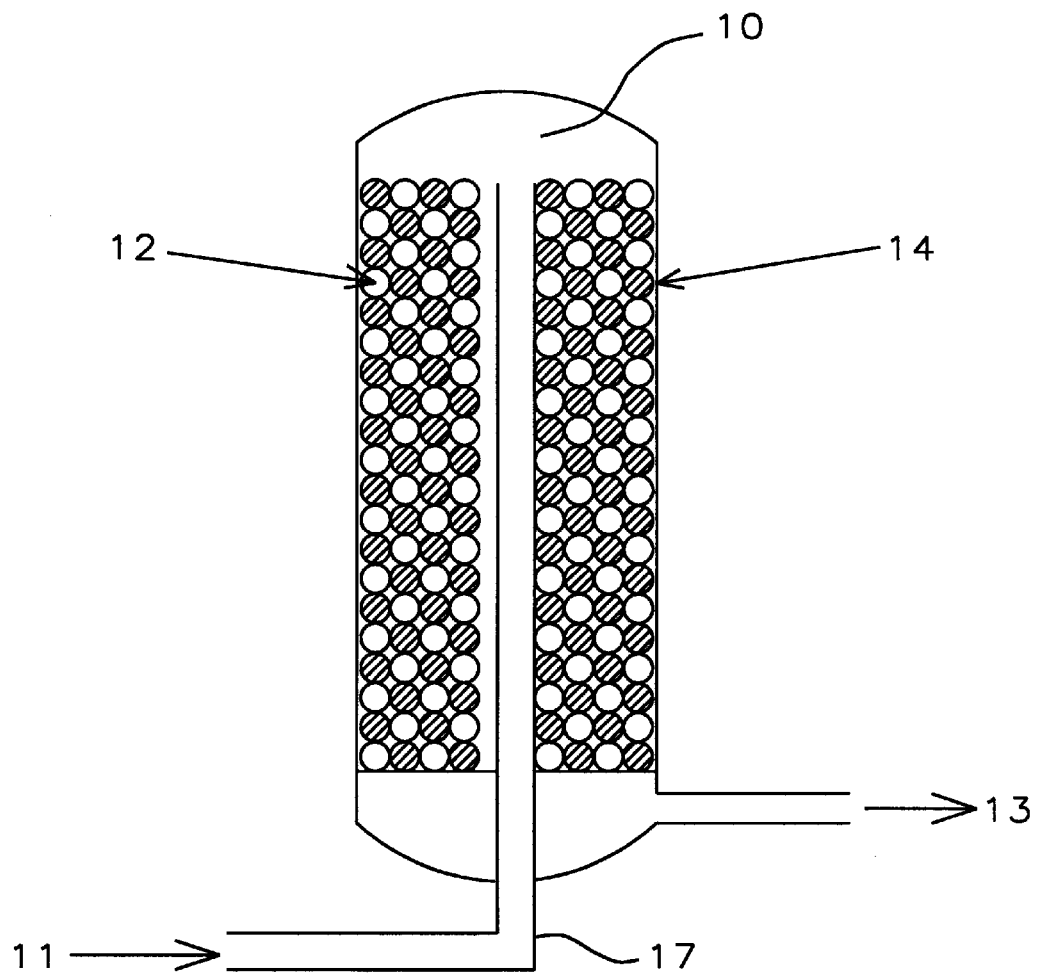
FIG. 1 illustrates an ion exachange resin column of a type that could be used to generate deionized water.
Figure 3:
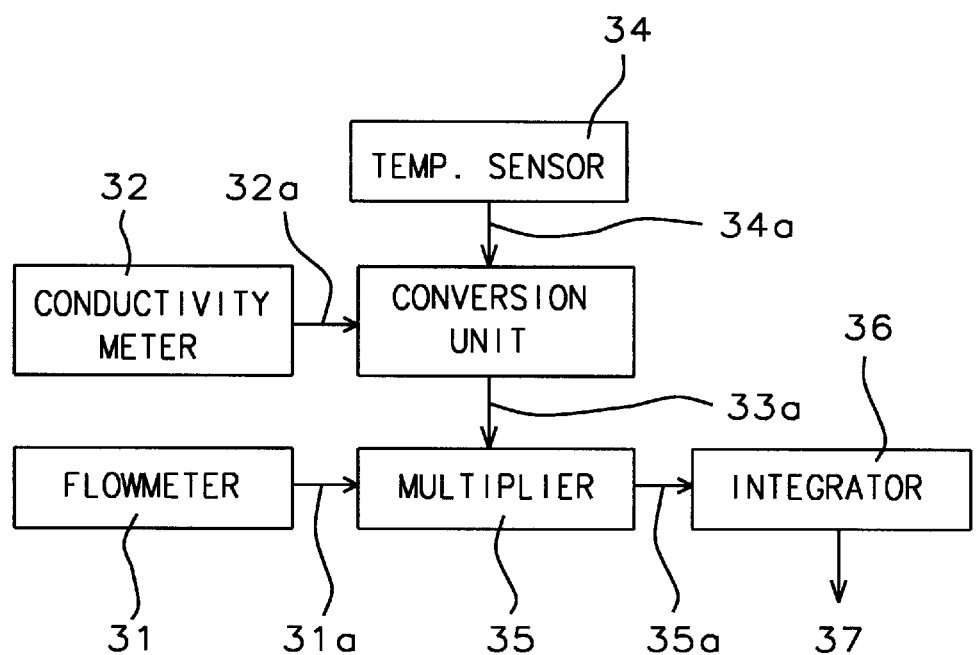
FIGS. 3 and 4 illustrate two embodiments of the invention wherein the accumulated impurity dosage is computed from a combination of flow, conductivity, and temperature measurements.

We refer now to FIG. 3 where a first embodiment of the present invention is illustrated in block form. Untreated water enters the unit through an input port (such as 17 in FIG. 1). Before it enters the resin column itself, all the untreated water passes through flowmeter 31 (which may be mechanical, hydraulic, optical, or magnetoepectric) while some (or all) also passes through conductivity meter 32. 31 and 32 output analog signals 31a and 32a respectively that are proportional to the conductivity and flow rate. A temperature sensor 34 measures the temperature of the incoming untreated water and outputs signal 34a. Signals 32a and 34a, after conversion to digital signals if appropriate, serve as inputs to conversion unit 33 where the conductivity value measured in 32 is first adjusted by subtracting the contribution made by pure water ($55 \times 10^{-9}$ ohm$^{-1}$-cm$^{-1}$ at 25° C.) and then used, together with the temperature data contained in 34a, to calculate the impurity concentration in the untreated water.

The impurity concentration is inputted to multiplier unit 35 (which may be of a digital or an analog design) as signal 33a where its product with flow data 31a is formed to give an instantaneous value for quantity of impurity (by weight) that is flowing into the system in unit time. Output 35a from multiplier unit 35 is fed into integrator unit 36 (which may be of digital or analog design or even purely mechanical) where 35a is sampled at known (also usually regular) intervals of time and accumulated into a total dosage value. Typically the regular time intervals fell in the range of from about 1 millisecond to about 10 minutes. Each time a new dosage value is computed it is compared with the known capacity of the unit and as soon as this latter value is reached or exceeded signal 37 is outputted and used to drive a warning system of some kind. Alternatively, 37 may carry the instantaneous dosage value at all times and be used to drive a suitable display.

Figure 5:
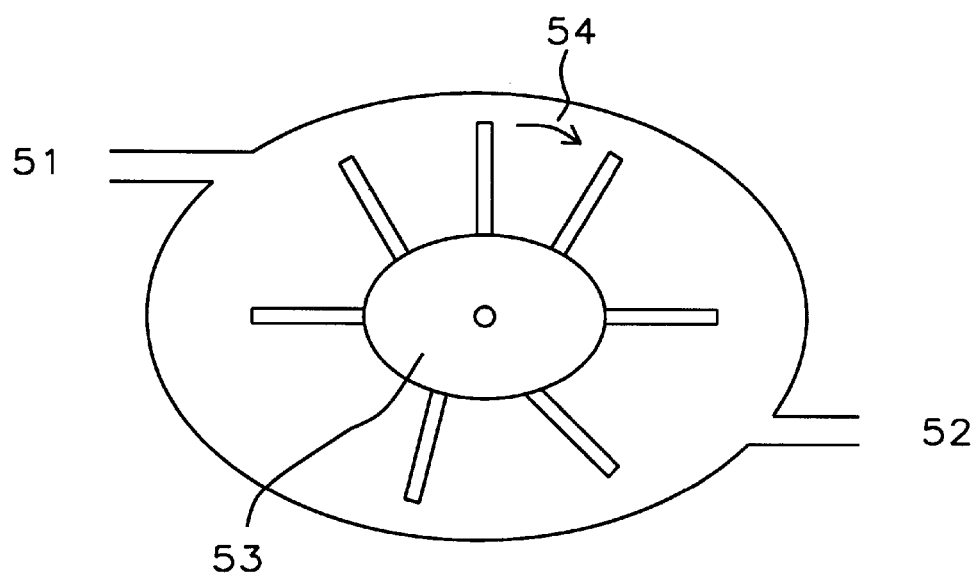
FIGS. 5 and 6 illustrate a mechanical and a hydraulic flowmeter respectively.
Figure 6:
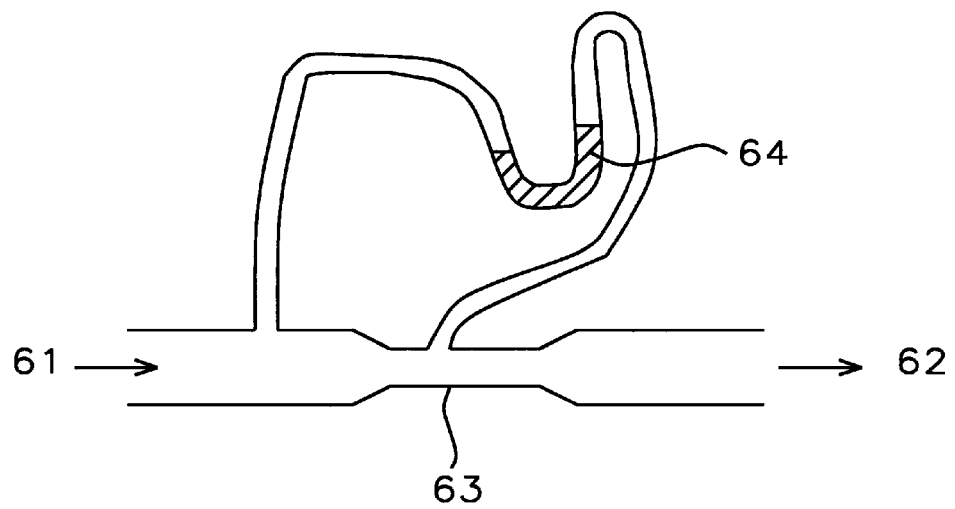

Referring now to FIG. 5, we illustrate an example of a mechanical type of flowmeter. Untreated water, which enters at 51 and exits at 52, causes spoked wheel 53 to rotate in direction 54, at the same time driving a small electric generator (not shown) that puts out a signal whose level is proportion to the flow rate. In FIG. 6 we illustrate a hydraulic style flowmeter. Untreated water enters at 61 and exits at 62 but is forced to flow through constricted region 63. As a consequence of the Bernouille effect the pressure normal to the walls will be less at 63 than at 61 (or 62). This difference in pressure increases with flow rate and drives manometer 64 where the difference in column heights is converted to an electrical signal, either directly from floating rheostat contacts or indirectly from an optical detector.

Figure 4:
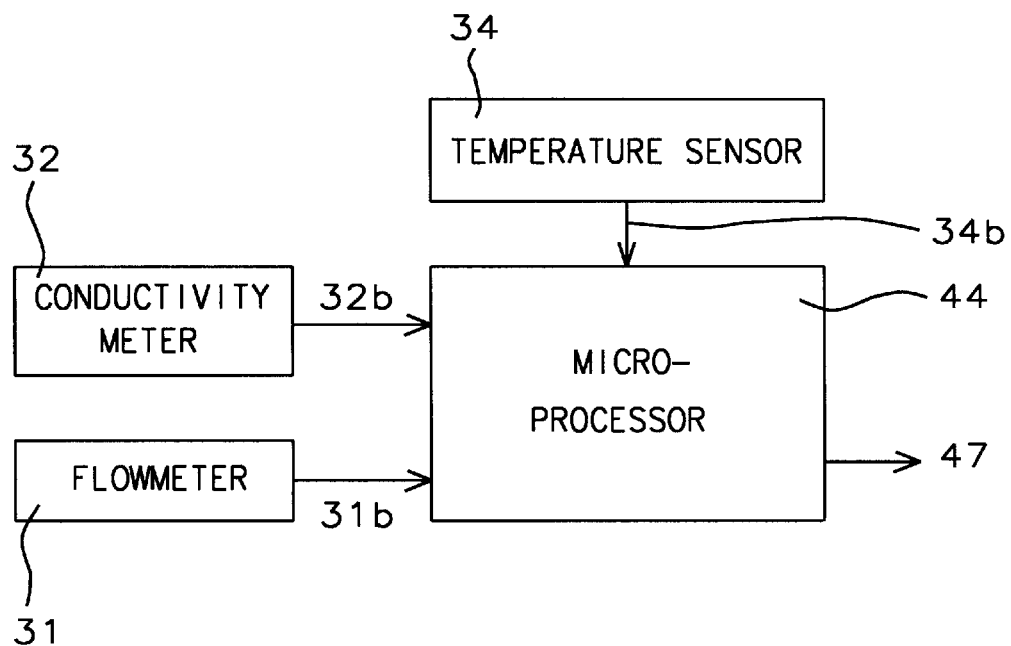

In FIG. 4 we show a second embodiment of the present invention, also described in block form. Untreated water enters this unit through an input port (such as 17 in FIG. 1). Before it enters the resin column itself, all the untreated water passes through flowmeter 31 (which may be mechanical, hydraulic, optical, or magnetoelectric) while some (or all) also passes through conductivity meter 32. 31 and 32 output analog signals 31$b$ and 32$b$ respectively that are proportional to the conductivity and flow rate. A temperature sensor 34 measures the temperature of the incoming untreated water and outputs signal 34$b$. Signals 31$b$, 32$b$, and 34$b$, after conversion to digital format, all serve as inputs to microprocessor 44 where the conductivity value measured in 32 is first adjusted by subtracting the contribution made by pure water ($55 \times 10^{-9}$ ohm$^{-1}$-cm$^{-1}$ at 25° C.) and then used, together with the temperature data contained in 34$b$, to calculate the impurity concentration in the untreated water.

In 44, the impurity concentration is multiplied by the calculated impurity concentration to give an instantaneous value for quantity of impurity (by weight) that is flowing into the system in unit time. The calculated weight/unit time value is sampled at known (also usually regular) intervals of time and accumulated in a register to provide a total dosage value. Typically, the regular time intervals were in the range of from about 1 millisecond to about 10 minutes. Each time a new dosage value is computed it is compared with the known capacity of the unit and as soon as this value is reached or exceeded signal 47 is outputted and used to drive a warning system of some kind. Alternatively, 47 may carry the instantaneous dosage value at all times and be used to drive a suitable display.

While the invention has been particularly shown and described with reference to the preferred embodiments thereof, it will be understood by those skilled in the art that various changes in form and details may be made without departing from the spirit and scope of the invention.

What is claimed is:

1. A dosage monitor for a deionized water generator comprising:

a conductance meter, through which untreated water entering the generator flows, that outputs a first signal;

a flowmeter, through which all untreated water entering the generator flows, that outputs a second signal;

a temperature sensor for the untreated water, that outputs a third signal;

a conductance-to-concentration converter, receiving as inputs said first and third signals, that outputs a fourth signal;

a multiplier unit, receiving as inputs the second and fourth signals, that outputs a weight-per-unit-time signal at known time intervals; and an integrator unit, receiving as input said weight-per-unit-time signal, that outputs the dosage.

2. The dosage monitor described in claim 1 wherein said conductance-to-concentration converter is a microprocessor.

3. The dosage monitor described in claim 1 wherein the flowmeter is selected from the group consisting of mechanical flowmeters and hydraulic flowmeters.

4. The dosage monitor described in claim 1 wherein the integrator unit is selected from the group consisting of digital, analog, and mechanical integrator units.

5. The dosage monitor described in claim 1 wherein the multiplier unit is selected from the group consisting of digital and analog multiplier units.

6. The dosage monitor described in claim 1 wherein the conductance-to-concentration converter, the multiplier unit, and the integrator unit are all parts of a microprocessor.

7. A process for monitoring the accumulated dosage of a deionized water generator comprising:

providing a conductance meter, a flowmeter, and a temperature sensor;

causing untreated water entering the generator to pass through the conductance meter, thereby generating a first signal;

causing all untreated water entering the generator to pass through the flowmeter, thereby generating a second signal;

immersing the temperature sensor in the untreated water, thereby generating a third signal;

connecting said first, second, and third signals to a microprocessor;

converting said second signal to a flow rate value;

converting said third signal to a temperature value;

converting said first signal and said temperature value to an impurity concentration value;

at known time intervals, multiplying said flow rate value by said impurity concentration value, thereby generating a weight-per-unit-time value; and integrating said weight-per-unit-time value over time, thereby generating a value for the accumulated dosage.

8. The process of claim 7 wherein the step of converting said first signal and said temperature value to an impurity concentration value further comprises computing from a formula.

9. The process of claim 7 wherein the step of converting said first signal and said temperature value to an impurity concentration value further comprises computing from lookup tables.

10. The process of claim 7 wherein the step of integrating said weight-per-unit-time value over time further comprises using regular time intervals and accumulating, in a register of the microprocessor, weight-per-unit-time values generated during said regular time intervals.

11. The process of claim 7 wherein the step of integrating said weight-per-unit-time value over time further comprises driving a mechanical integrator with said weight-per-unit-time value.

12. The process of claim 7 wherein the step of connecting said first, second, and third signals to a microprocessor further comprises first passing each signal through an analog-to-digital converter.

13. The process of claim 7 wherein said value for the accumulated dosage is used to drive an alarm system.

14. The process of claim 7 wherein said value for the accumulated dosage is used to drive a display.

15. The process of claim 7 wherein each said known time interval is between about 1 millisecond and about 10 minutes.

16. The process of claim 7 wherein the step of converting said first signal and said temperature value to an impurity concentration value further comprises computing by successive approximation.

* * * * *

UNITED STATES PATENT AND TRADEMARK OFFICE
CERTIFICATE OF CORRECTION

PATENT NO. : 6,216,092 B1
DATED : April 10, 2001
INVENTOR(S) : Sik On Kong

It is certified that error appears in the above-identified patent and that said Letters Patent is hereby corrected as shown below:

Title page,
Item [75], correct "Szk-On Kong" so that it reads -- Sik On Kong --

Signed and Sealed this

Sixteenth Day of October, 2001

Attest:

*Nicholas P. Godici*

NICHOLAS P. GODICI
*Attesting Officer*  *Acting Director of the United States Patent and Trademark Office*